F. DECKER.
CHEESE CUTTING MACHINE.
APPLICATION FILED MAR. 17, 1911.
1,022,125.
Patented Apr. 2, 1912.
2 SHEETS—SHEET 2.
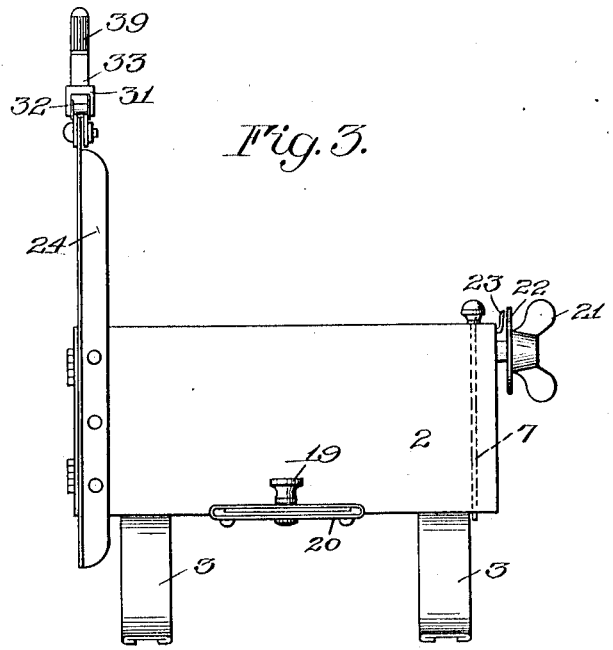
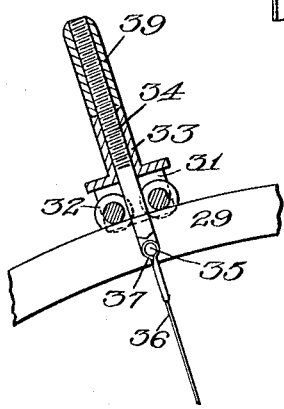
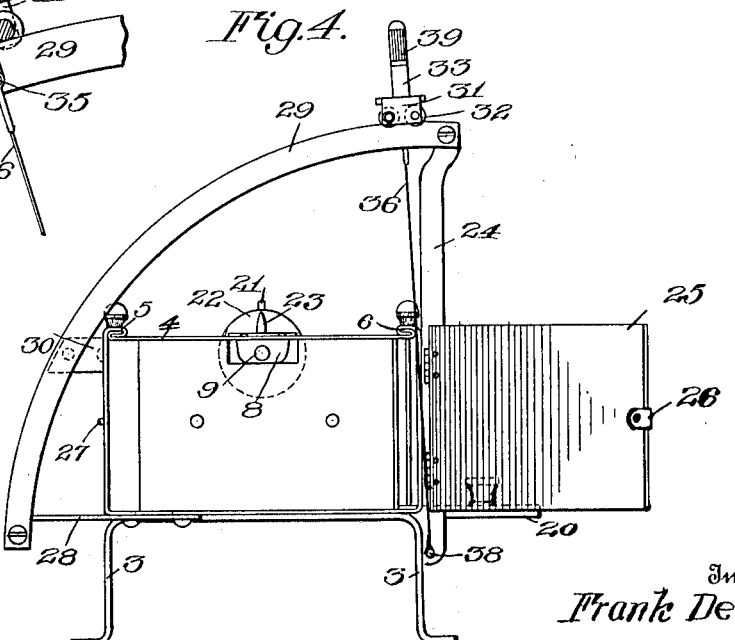
Inventor
Frank Decker

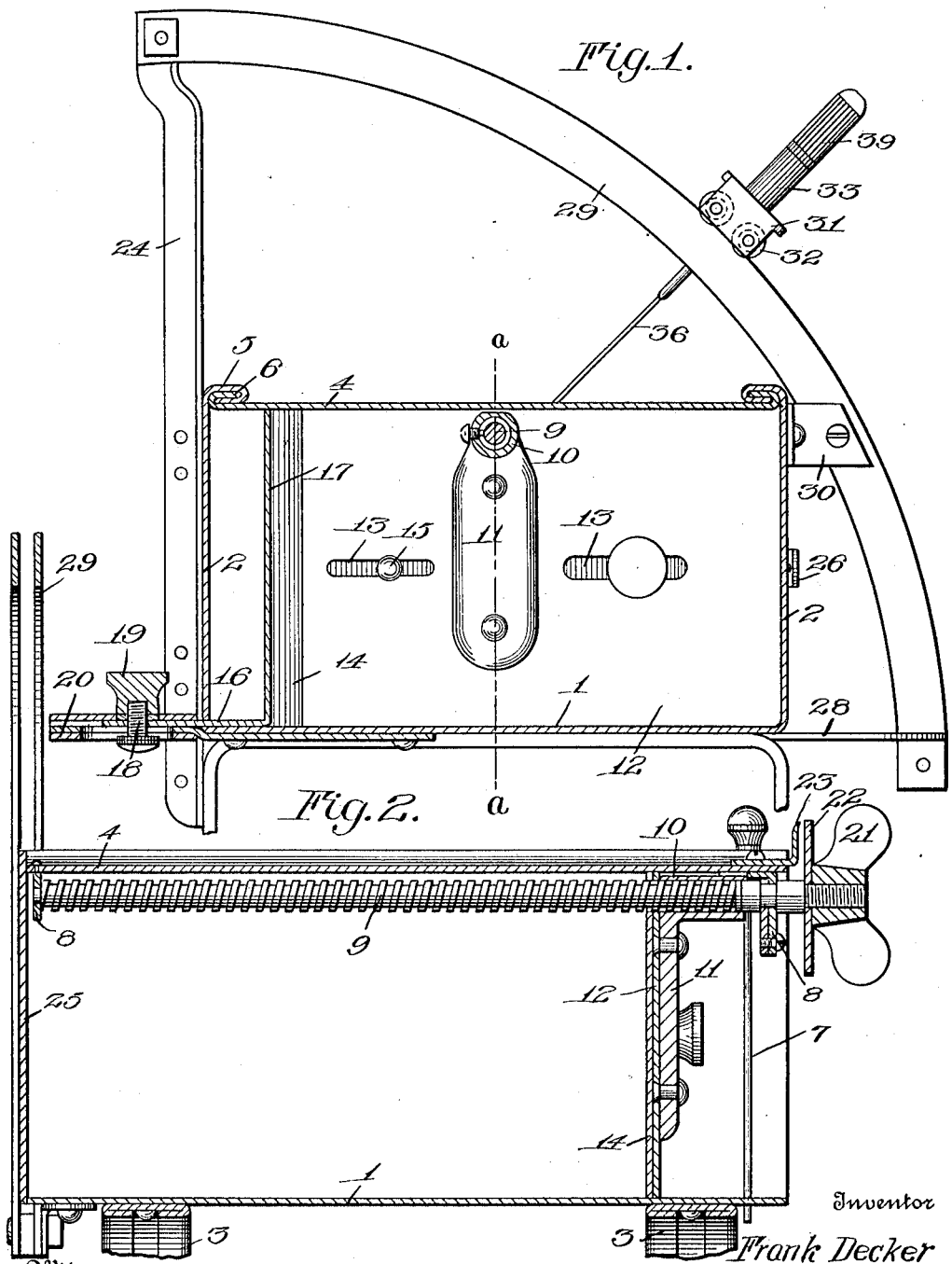

UNITED STATES PATENT OFFICE.

FRANK DECKER, OF ROCHESTER, NEW YORK.

CHEESE-CUTTING MACHINE.

1,022,125. Specification of Letters Patent. Patented Apr. 2, 1912.

Application filed March 17, 1911. Serial No. 615,031.

*To all whom it may concern:*

Be it known that I, FRANK DECKER, of Rochester, in the county of Monroe and State of New York, have invented certain new and useful Improvements in Cheese-Cutting Machines; and I do hereby declare the following to be a full, clear, and exact description of the same, reference being had to the accompanying drawings, forming a part of this specification, and to the reference-numerals marked thereon.

The present invention relates to cheese cutting machines, and has for its object to provide a simplified form of construction adapted for holding cheeses of different sizes and dispensing the same in slices, as desired.

To these and other ends the invention consists in certain improvements and combinations of parts all as will be hereinafter more fully described, the novel features being pointed out in the claims at the end of the specification.

In the drawings: Figure 1 is a view in elevation, partly in section, looking at the rear end of a machine embodying my invention; Fig. 2 is a longitudinal sectional view on the line *a—a* of Fig. 1; Fig. 3 is a view in side elevation of the machine; Fig. 4 is an end elevation looking toward the front of the machine, showing the hinged closure in open position, and Fig. 5 is a detail sectional view of the tightening means for the cutting device.

Similar reference numerals throughout the several figures indicate the same parts.

The invention is designed more especially for use in connection with soft cheeses, such for instance as limburger cheese, provision being made for slicing the cheese without necessitating the hand of the operator coming in contact therewith, and there being a receptacle that may be entirely closed, when not in use, so as to keep the cheese in a fresh condition, and confine the undesirable odors emanating therefrom within the receptacle, thus obviating the most objectionable features in the consumption of such cheese.

The present embodiment of the invention, as herein illustrated, comprises a receptacle, preferably formed of sheet metal and consisting of a bottom portion 1 and sides 2, the bottom portion having suitable supporting standards 3 secured thereto. The receptacle is provided with a top portion 4, which is removably secured to the sides 2 in any convenient manner as, in the present instance, by means of flanges 5 and 6 coöperatively arranged on the sides and top portion, respectively, which afford a sliding action between the parts so that the top and its associated parts may be readily removed from the receptacle for the purpose of cleaning. The top may be held in engagement with the sides of the receptacle in any convenient manner, as by means of locking pins 7, which engage openings in the side flanges, top flanges, and bottom of the receptacle, respectively, the pins being preferably loosely positioned when in locking engagement, so as to be easily removed.

Attached to the top portion 4 are brackets 8 in which is journaled a worm shaft 9. The sleeve 10 is arranged for threaded engagement with the worm shaft 9 and carries a downwardly extending portion 11 to which is fixedly attached the follower 12 having slotted openings 13 arranged transversely thereof. The follower 12 is preferably provided with adjustable means for varying its size, and to this end, an extension plate 14 is arranged for slidable engagement with the follower, being held frictionally in contact therewith by means of suitable pins 15 arranged on the extension plate and extending through the slotted openings 13 to engage the opposite faces of the follower.

The receptacle is preferably arranged for adjustment of its interior capacity, the extensible follower constituting the closure for one end of the receptacle, and for this purpose, a wall is provided which is adapted to be moved toward and from the end of the follower, and comprising, in the present instance, a base 16 supported upon the bottom 1 of the receptacle, and the upright portion 17 extending to the top of the receptacle. A suitable opening is provided at the base of the receptacle in the side wall, to accommodate the base portion 16 of the adjustable wall, the latter being held frictionally in adjusted position, being guided by means of the bolt 18 and nut 19 coöperating with a slotted bracket 20 formed at the side of the receptacle. By the means just described, the wall 17 may be adjusted to any position so as to engage the edge of the extension as the latter is adjusted on the follower to accommodate cheeses of different sizes, an entirely closed receptacle being thus afforded at all times. The worm shaft 9 is provided with an operating thumb nut 21 and a scale 22, the latter being fixed to the shaft and having marks or indications thereon corresponding, respectively, to the movements of the follower through 1/16, 1/8, 3/16 and 1/4 parts of an inch, a stationary indicator 23 being arranged on the receptacle to coöperate with the scale 22, by which the follower is set according to the thickness of the slice desired.

Arranged at the front end of the receptacle, and preferably hinged to a standard 24, is a door or closure 25, having a spring catch 26 adapted to engage a projection 27, to lock the door in closed position. An arm 28 is secured to the opposite side of the receptacle, and at the base thereof, the arm 28 and standard 24 serving as supports for the guides 29, which are additionally held by means of the bracket 30. A carrier 31 is arranged for movement on the guides 29 by means of rollers 32 mounted on the carrier, the latter having an upwardly extending sleeve 33 adapted to receive a threaded stem 34, having a pin 35 arranged at its lower end. The cutting device, in the present embodiment, comprises a wire 36 having a loop 37 formed at each end and adapted to engage pins 35 and 38, respectively, the latter being arranged at the base of standard 24. Suitable means may be provided for tightening the wire 36, and comprising in the present instance, a nut 39 threaded on the stem 34, and engaging against the upper end of sleeve 33.

In the operation of the machine, when it is desired to cut a portion from the cheese, the door 25 is opened, and the follower turned to project the cheese the necessary distance according to the thickness of the slice to be cut, which is determined by the indicating device already described. The carrier is then moved from the top of the guides downwardly, causing the wire edge to engage the cheese and sever the end therefrom. After using, the carrier is returned to its operative position, as appearing in Fig. 4, and the door is closed, the cutting wire being housed between the receptacle and the door in substantially the position shown.

By the present structure, there is afforded a machine of extremely convenient operation, and which may be completely closed at all times except when in use, the interior being adjustable for use with cheeses of various sizes. In addition to this, a further important advantage lies in the fact that it may be readily taken apart for the purpose of cleaning, and the cutting device can easily be renewed and adjusted, at comparatively very little cost.

I claim as my invention:

1. In a slicing machine, the combination with a receptacle, of a follower movable within the receptacle, an extension slidably adjustable on the follower to different positions for varying the size thereof, a wall adjustable within the receptacle to engage the edge of said extension and having an extended base portion adapted to rest upon the bottom of the receptacle, and a cutting device arranged in advance of the follower.

2. In a slicing machine, the combination with a receptacle, of a follower movable within the receptacle, an extension slidably adjustable on the follower to different positions for varying the size thereof, a wall adjustable within the receptacle to engage the edge of the extension and having an extended base portion, means for adjustably securing the base portion on the bottom of the receptacle, and a cutting device arranged in advance of the follower.

3. In a slicing machine, the combination with a receptacle, of a follower movable within the receptacle, an extension slidably adjustable on the follower to different positions for varying the size thereof, a wall adjustable within the receptacle to engage the edge of the extension and having a right-angled base portion adapted to rest on the bottom of the receptacle in parallelism therewith, means for adjustably securing said base portion on the bottom of the receptacle, and a cutting device arranged in advance of the follower.

4. In a slicing machine, the combination with a receptacle, of a follower movable within the receptacle, an extension slidably adjustable on the follower to different positions for varying the size thereof, a wall adjustable within the receptacle to engage the edge of the extension and having a right-angled base portion resting on the bottom of the receptacle and arranged for movement through an opening in the side of the receptacle, means for adjustably securing said base portion on the bottom of the receptacle, and a cutting device arranged in advance of the follower.

5. In a slicing machine, the combination with a receptacle, of a follower movable within the receptacle, an extension slidably adjustable on the follower to different positions for varying the size thereof, a wall adjustable within the receptacle to engage the edge of the extension and having a right-angled base portion resting on the bottom of the receptacle and movable through an opening in the side of the receptacle, means arranged without the receptacle for adjustably securing said base portion relatively to the side of the receptacle, and a cutting device arranged in advance of the follower.

6. In a slicing machine, the combination with a closed receptacle comprising sides and a top slidably engaging the sides, of a follower carried by the top and movable relatively thereto, said follower constituting a closure for one end of the receptacle, and a cutting device arranged in advance of the follower at the opposite end of the receptacle.

7. In a slicing machine, the combination with a closed receptacle comprising side and top walls, one of the walls being slidably engaged with the remaining walls, of a follower carried by the removable wall and having movement relatively thereto, said follower constituting a closure for one end of the receptacle, and a cutting device arranged in advance of the follower at the opposite end of the receptacle.

8. In a slicing machine, the combination with a closed receptacle comprising sides and a top slidably engaging the sides, of brackets mounted on the top, a worm journaled in the brackets, a follower movable on said worm and constituting a closure for one end of the receptacle, and a cutting device arranged in advance of the follower at the opposite end of the receptacle.

9. In a slicing machine, the combination with a receptacle, of a worm shaft journaled in the receptacle, a follower having engagement with the worm shaft, an indicating scale fixed on the worm shaft, an indicator positioned on the receptacle and coöperating with the indicating scale, and a cutting device arranged in advance of the follower.

10. In a slicing machine, the combination with a receptacle, of a hinged closure for the receptacle, a stationary guide, and a cutting device arranged on the receptacle and comprising a flexible member adapted to be supported on and to move transversely of the guide, the flexible member being disposed between the receptacle and the closure when the latter is closed.

11. In a slicing machine, the combination with a hinged closure for the receptacle, a cutting device arranged on the receptacle and comprising guides, a device movable between the guides, and a flexible member having one end adjustably secured to the movable device and its opposite end to the receptacle, said flexible member being disposed between the receptacle and the closure when the latter is closed.

12. In a slicing machine, the combination with a receptacle, of a closure for the receptacle, a cutting device arranged on the receptacle and including guides, a device movable between the guides, a flexible member adjustably connected to the movable device, and a tightening means for engagement with the movable device to maintain the flexible member under tension, said flexible member being disposed between the receptacle and the closure when the latter is closed.

13. In a slicing machine, the combination with a receptacle, of a closure for the receptacle, a cutting device arranged on the receptacle and comprising guides, a flexible member having one end pivoted to the receptacle, a carrier movable between the guides and having the opposite end of the flexible member pivoted thereto, a threaded portion on the carrier, and a nut engaging the threaded portion to maintain the flexible member under tension, said flexible member being disposed between the receptacle and the closure when the latter is closed.

14. In a slicing machine, the combination with a receptacle, of a hinged closure for the receptacle, and a cutting device arranged to move transversely of the end of the receptacle and to lie between the receptacle and the hinged closure when the latter is closed.

15. In a slicing machine, the combination with a receptacle, of a hinged closure for the receptacle, and a cutting device comprising a flexible member arranged to move transversely of the end of the receptacle and to lie between the receptacle and the hinged closure when the latter is closed.

FRANK DECKER.

Witnesses:
RUSSELL B. GRIFFITH,
H. E. STONEBRAKER.

Copies of this patent may be obtained for five cents each, by addressing the "Commissioner of Patents, Washington, D. C."